United States Patent Office 2,865,906
Patented Dec. 23, 1958

2,865,906

PROCESS FOR THE FRACTIONATING OF SULPHITE LYE

John Höye, Nygard, Norway, assignor to Aktieselskabet Token Cellulosefabrik, Nygard, Norway No Drawing. Application December 19, 1955
Serial No. 553,711

Claims priority, application Norway December 24, 1954

12 Claims. (Cl. 260—124)

The solid part of sulphite lye (the waste liquor after the pulping of wood by the sulphite process) contains a large number of organic substances, which—dependent on the cooking conditions—may be said in general to consist of about 45% high-molecular ligninsulphonic acids, 20–25% low-molecular ligninsulphonic acids, and about 10% sulphocarboxylic acids and carboxylic acids. Besides these there are 15–20% carbohydrates, whereof 3–4% are in the form of pentoses. These various constituents make sulphite lye of interest for many technical purposes. Thus the hexoses can be fermented to spirit; from both hexoses and pentoses yeast (torula) can be produced, and from the pentoses furfural can be produced. The low-molecular ligninsulphonic acids can be used for the production of, for example, vanillin, and the high-molecular acids have found wide application as auxiliary tanning substances, dispersing agents and the like. Generally speaking, the high-molecular ligninsulphonic acids are not serviceable for the same industrial purposes as the low-molecular acids. It is therefore of great technical value to be able to effect a practically quantitative fractionating of the high- and low-molecular constituents in a rational way; at the same time a fractionated isolation of the sulphite lye contents of carbohydrates, carboxylic acids and sulphocarboxylic acids would give to these constituents a far greater significance and value.

Common to all hitherto known methods for the fractionating of sulphite lye is that the processing takes place in the aqueous phase, i. e. in the sulphite lye as such, if desired after partial evaporation. It has thus been suggested to precipitate the ligninsulphonic acids with for example lime milk (the Howard process), with certain amines or other bases, and with ethanol or propanol. Salting out by means of strong acids or salts has also been proposed. The components thus precipitated are however very aqueous and sticky, and therefore difficult to work up. In addition it has not been feasible by these known processes to obtain a fractionated separation also of the lower molecular components of the lye in a technical and economical way.

The present invention relates to a process according to which it is possible to obtain a complete separation of the main constituents of waste sulphite lye. This process leads to an isolation of the following characteristic lye fractions:

Fraction 1. The high-molecular ligninsulphonic acids.
Fraction 2. The low-molecular ligninsulphonic acids.
Fraction 3. The sulpho-carboxylic acids.
Fraction 4. The aldonic acids.
Fraction 5. The carbohydrates.

Fractions 1 and 2 belong to the aromatic organic class of substances, while fractions 3 and 4 are of an aliphatic organic nature. Fraction 5 consists of hexoses and pentoses.

The fractionating of the aforesaid acid substances in the sulphite lye, pursuant to the invention, is in the first place based on the general perception that ammonium salts of the acid constituents are more easily soluble in certain organic solvents than the corresponding alkali metal salts, which latter on their part are more easily soluble than the salts of metals of higher valence, and in the second place on the perception that the solubility of the salts of the various acid fractions which contain the same cation increases from the said fraction 1 to fraction 4:

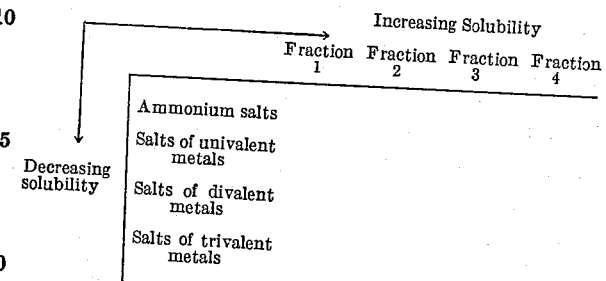

Thus the fractionating process according to the invention is in one aspect based on the employment of certain organic solvents for effecting the fractionation, and it is therefore an important feature of the procedure that it is effected in practically non-aqueous liquid and, in accordance herewith, it is an important feature of the procedure that the sulphite lye is first evaporated to practically anhydrous state, and that the aforementioned solubility proportions of the salts of the acid substances in the organic liquids are utilized. In general, the ammonium salts have the most favorable solubility proportions for carrying out the process, and the sulfite lye is therefore treated first, where necessary, in order to convert it to an ammonium sulphite lye, for example, by replacing cations by ammonium-ions in a per se known way, for example by ion-exchange. If the lye is an ammonium sulphite lye obtained from an ammonium sulphite process—such a conversion is of course unnecessary.

The organic solvents used in the process according to the invention are lower aliphatic alcohols, and it has been found that the water-miscible lower aliphatic alcohols having a dielectric constant higher than about 27, and comprising methyl alcohol, ethyl alcohol, ethylene glycol, glycerine or mixtures thereof, can with especial advantage be used for dissolving all the components of the lye, except the high-molecular ligninsulphonic acid salts, so that these can be separated from the other constituents, while the water-miscible lower aliphatic alcohols having a dielectric constant lower than 27, namely alcohols with 3 or 4 carbon atoms, such for instance, as n-propanol and iso-butanol or mixtures of such alcohols, can with particular advantage be used for precipitating out the low-molecular ligninsulphonic acid salts which are dissolved in the first-mentioned alcohols, especially methyl alcohol or ethyl alcohol, while on the other hand the other constituents, the sulphocarboxylic- and aldonic acids, and the carbohydrates of the sulphite lye will remain dissolved in the mixture of these alcohols.

In order now to fractionate the last mentioned acid components, use is made of the aforesaid solubility ratios of the salts of these acid constituents.

By using lower aliphatic alcohols having a dielectric constant higher than about 27, all the components of the lye, except the high-molecular ligninsulphonic acid salts, can, as above stated, be dissolved. By using aliphatic alcohols with a dielectric constant substantially higher than 27, as ethylene glycol and glycerine, the lye powder can be brought entirely into solution. By a stepwise adding of suitable precipitation agent to such solutions, subdivision of the whole content of ligninsulphonic acids with continually decreasing molecular weight can be obtained. However, the use of alcohols with very high dielectric constant brings the disadvantage that the fractionating by precipitation requires large amounts of precipitation agent, and in general the dielectric constant of the extraction liquids should not exceed about 50.

The selection of a proper extraction liquid thus depends on the use in view for fractions 1 and 2, since an increase in the average molecular weight of fraction 1, also leads to an increase in the average molecular weight of fraction 2. Methyl alcohol is of special technical value as extraction liquid, but ethyl alcohol, ethylene glycol and other similar liquids may also be used.

In accordance with the above, in carrying out the fractionating process for separating the various components of the sulphite lye the procedure can be carried out as follows:

Sulphite lye which contains ammonium as principal cations is evaporated to a practically dry powder; this powder is extracted by means of a water-miscible lower aliphatic alcohol having a dielectric constant not lower than 27 (methyl alcohol, ethyl alcohol or mixtures thereof), and the insoluble salts of the high-molecular ligninsulphonic acids are removed from the solution obtained, and to this solution is added water-miscible aliphatic alcohol or aliphatic alcohols having a dielectric constant lower than 27 (propanol, butanol or mixtures of these), and thereby the ammonium salts of the low-molecular ligninsulphonic acids are precipitated. The precipitated salts of these acids are removed from the solution, and to the solution thus obtained is added an alkali base, dissolved in alcohol, so that the solution has a pH of about 10, thereby precipitating the sodium sulpho-carboxylic acids, the sodium salts of which are insoluble in the alcohol mixture obtained. The precipitated sodium salts are removed from the solution, to which is then added a soluble metal salt, the cation of which has a valence exceeding 1, especially calcium, whereby the aldonic acids are precipated as salts, and these salts of the aldonic acids are removed and the solution obtained is treated in a per se known way for removal of the electrolytes, and finally the alcohols are recovered by fractionated distillation, with the result that the carbohydrates are finally left as a separate fraction.

By proceeding in this way there is obtained a very satisfactory and relatively complete separation of the aforesaid substances in the sulphite lye.

As will be seen from the above, the sulpho-carboxlic acids, fraction 3, are precipitated by the addition to the solution obtained of an alkali base, preferably NaOH, in as amount sufficient to raise the pH-value to about 10. The alkali base excess is also used in order to simultaneously split the ring structure of the aldonic acids, which originally are extracted in the lactone form. This ring-opening proceeds very fast at higher pH, and is necessary for the further separation procedure, also because the dissociation of the aldonic acids only takes place at pH-values above 8-9 in the organic liquid system. The isolation of the aldonic acids (fraction 4) is then effectuated in the filtrate through precipitation with equivalent amounts of a suitable metal salt. Chloride of lime is here preferred, but as indicated by the solubility table above, equivalent amounts of other salts having cations with higher valency than 1 may be employed as well.

The filtrate now contains only the carbohydrates, beside minor amounts of impurities which are removed in per se known ways, e. g. by precipitation, or by ion exchange. This fraction is isolated by subjecting the purified solution to fractionated distillation, thereby recovering the said alcohols, leaving the pure carbohydrates as distillation residue.

The solubility of the ammonium salts of the low-molecular ligninsulphonic acids in the said extraction alcohols, for example methyl alcohol, is rather good, and a surplus of the precipitating alcohols should therefore be employed in order to obtain a complete precipitation of fraction 2, the low-molecular ligninsulphonic acids.

According to one embodiment of the invention it is, however, possible to reduce this excess of precipitating alcohol considerably by using a somewhat modified separation process. This process, which is based on the already mentioned lower solubility of the alkali metal salts of fraction 2 compared with the corresponding ammonium salts, consists in adding to the extraction solution an alkali base, preferably NaOH, in an amount about equivalent to the low-molecular ligninsulphonic acids, thereby forming the corresponding alkali metal salts of said acids, and precipitating these salts by means of small amounts of propanol or butanol. The addition in this case only of small amounts of said alcohols does not precipitate the somewhat better soluble alkali metal salt of fraction 3. This fraction is separated by precipitating with equivalent amounts of a metal salt, the cation of which has a valency higher than 1, preferably chloride of lime. After filtration, the pH of the filtrate is raised to between 8 and 11 with an alkali base in order to split the lactone structure and to obtain a dissociation of the aldonic acids, and these acids (fraction 4) are precipitated by adding equivalent amounts of a metal salt, the cation of which has a valency higher than 1, preferbly chloride of lime. The isolation of the carbohydrates is effectuated as already described.

It will be understood that the invention is not restricted to the separation processes already mentioned. Other modifications in the precipitation art may thus be employed without changing the principal picture of the invention. It is thus possible to omit the use of propanol or butanol and instead thereof to use a fractionated precipitation procedure with an alkali base and metal salts alone. The low-molecular ligninsulphonic acids extracted from example in methanol can thus be precipitated from the alcoholic solution by adding NaOH, dissolved in alcohol, in excess to a pH between 10 and 12, for example about 11.8 whereupon the precipitated sodium salts of the acids are removed from the solution and the excess of NaOH is then precipitated from the solution by adding a mineral acid as concentrated sulphonic acid to a pH between 7 and 8. The precipitated sodium sulphates are removed, for example by filtration and the supho-carboxylic acids are precipitated, as for example as Ca-salts as previously described.

Finally, also sulphite waste lye, which has preliminarily been subjected to a fermentation process, i. e. by torula yeast, may be used. The purification procedure prior to the distillation step may then or course be omitted, as the carbohydrates have been removed by the fermentation process.

The following examples further set forth the invention by way of presently-preferred illustrative embodiments thereof.

Example 1

400 g. ammonium sulphite lye powder produced by evaporation of the waste liquor obtained after the pulping of wood, according to the ammonium sulphite process, and whereby $NH_3$ had been added during the evaporation process, so that a 1% solution of the powder in water at 20% C. showed pH 3.95, was extracted by means of 2000 ml. methanol for 4 hours at room temperature in a 2-liter flask provided with propeller stirrer having adjustable speed. At the end of the extraction period the stirrer was stopped, whereupon the undissolved substance quickly sedimented, and then the supernatant clear extract solution was decanted into another 2-liter flask with similar stirrer. The extraction residue remaining in the flask was then kneaded, and the separated residual extract was put together with the other extract solution, after which the extract residue was flushed and kneaded with 10 x 2 ml. methanol, which was then likewise added to the extract solution. The extract residue was then taken out of the flask and dried over $CaCl_2$ in vacuum desiccator and then weighed. Yield: 200.5 g. high-molecular ammonium ligninsulphonates. (The method described for both extraction and subsequent treatment or isolation of the extraction residue and subsequent drying has also been used in the following examples).

The dark-brown extract solution, the pH of which was 4.2, was then, under good stirring, by means of a pipette, the tip of which was inserted into the extract solution with relative slowness (this procedure has been used in all the examples for addition of both precipitant and precipitation liquid) given an admixture of 21 g. anhydrous $CaCl_2$ dissolved in 110 ml. methanol, whereby Ca-salts were precipitated, while at the same time the pH of the precipitation system fell to 3.2. Next, anhydrous $NH_3$ was under good stirring slowly introduced until the pH was 7.2 The precipitated Ca-salts were then filtered off in a 20 cm. Buchner funnel fitted with filtering paper, under moderate vacuum, and the filter cake was well sucked off and pressed, being then washed with methanol (10 x 3 ml.), after which good exhaustion by suction and pressing. Then the salts were dried over $CaCl_2$ in vacuum desiccator and weighed (the described procedure for filtration, washing and drying of the precipitated salts has been used in all precipations in the following examples). Yield: 118 g. low-molecular Ca-ligninsulphonates and a certain amount of Ca-salts of low-molecular sulphocarboxylic acids.

The brownish residual extract solution was then under stirring cooled to 8° C., whereby more precipitation took place. The precipitated salts were then filtered off, washed (10 x 2 ml. methanol) and dried, as stated above, and then weighed. Yield: 11 g. Ca-salts of low-molecular sulphocarboxylic acids.

Next, the residual extract solution was first conducted through a 200 g. column of Dowex 50 in acid form (previously regenerated with 1 N HCl and then washed with water, whereupon the water remaining in the column was expelled by means of methanol, which in its turn was withdrawn separately by expulsion from the column in front of the residual extract solution. (This method of pre-treatment of the ion exchange columns has been used in all the following examples.) The residual extract solution was then passed through a 250 g. column of Amberlite IRA400 in alkaline form (regenerated with NaOH and pre-treated in other respects like the Dowex column above), whereupon the saltless carbohydrates-containing residual extract solution was subjected to distillation under vacuum, whereby the methanol was driven over and recovered at 27–30° C., after which the distillation residue was given an addition of a little water and transferred into a glass dish. It was then first evaporated over a water-bath and then dried over $CaCl_2$ in a vacuum desiccator, and finally weighed. Yield: 64 g. carbohydrates and some aminized derivatives thereof. (The described procedure for final isolation and drying of the carbohydrates has been used in all the subsequent examples.)

Example 2

400 g. of the same ammonium sulphite lye powder as was used in Example 1 was extracted with 2000 ml. methanol for 4 hours at room temperature in the same way as in Example 1. Extraction residue: 192 g. high-molecular ammonium legninsulphonates.

(1) The dark-brown extract solution, the pH of which was 4.3, was then under good stirring and with relative slowness given an addition of 3.6 g. $CaCl_2$ dissolved in 30 ml. methanol, and at the same time with relative slowness an addition of NaOH dissolved in methanol, until the pH had been raised to 5.0. The precipitated Ca-salts were filtered off, washed (10 x 3 ml. methanol) and dried, as described in Example 1, and so weighed. Yield: 33 g. low-molecular Ca-ligninsulphonates containing about 12% $CaSO_4$.

(2) The dark-brown filtrate was then under good stirring given an addition of 17.5 $CaCl_2$ dissolved in 105 ml. methanol, whereby the pH of the precipitation system fell to 3.5. There was then slowly added NaOH dissolved in methanol until the pH was 5.0. The precipitated Ca-salts were then filtered off, washed (10 x 3 ml. methanol), dried and then weighed. Yield: 79 g. low-molecular Ca-ligninsulphonates.

(3) The yellow-brown filtrate was then under good stirring given slowly a further addition of NaOH dissolved in methanol until the pH was 6.6, after which the precipiated Ca-salts were filtered off, washed (10 x 2 ml. methanol), dried and weighed. Yield: 17 g. Ca-salts of low-molecular sulphocarboxylic acids.

(4) The still yellow-brown filtrate was given a further addition of NaOH dissolved in methanol until the pH was 8.7, after which the precipitated Ca-salts were filtered off, washed (10 x 2 ml. methanol), dried and weighed. Yield: 16 g. Ca-salts of sulphocarboxylic acids together with a little precipitated Ca-sulphite.

(5) The yellow-brown residual extract solution was first conducted through a 200 g. column of Dowex 50 in acid form, and then through a 250 g. column of amberlite IRA400 in alkaline form, after which the saltless carbohydrate-containing, residual extract solution was subjected to distillation under vacuum, whereby the methanol was recovered at 27–30° C., and then the distillation residue was given an addition of a little water and then dried, as stated in Example 1, and finally weighed. Yield: 61 g. carbohydrates (hexoses and pentoses).

Example 3

400 g. of the same ammonium sulphite lye powder as was used in Example 1 was extracted with 2000 ml. methanol for 4 hours at room temperature in the same way as described in Example 1. Extraction residue: 199 g. high-molecular ammonium ligninsulphonates.

(1) To the dark-brown extract solution, the pH of which was 4.2 was then slowly added, under good stirring, 50 g. anhydrous K-acetate dissolved in 170 ml. methanol, whereby the pH of the precipitation system rose to 7.05. The precipitated K-salts were filtered off, washed (10 x 4 ml. methanol), dried and weighed. Yield: 120 g. low-molecular K-ligninsulphonates together with some K-salts of low-molecular sulphocarboxylic acids.

(2) The light-brown filtrate was then, under stirring, cooled to 6° C., which resulted in more precipitation, which was filtered off, washed (10 x 2 ml. methanol), and then dried and weighed. Yield: 13 g. K-salts of low-molecular sulphocarboxylic acids.

(3) The light-brown residual extract solution was first conducted through a 170 g. column of Dowex 50 in acid form, and then through a 250 g. column of Amberlite IRA400 in alkaline form, after which the saltless, carbohydrate-containing, residual extract solution was subjected to distillation under vacuum, whereby the methanol was recovered at 25–28° C., and then a little water was added to the distillation residue, and the mixture dried and weighed. Yield: 62 g. carbohydrates (hexoses and pentoses).

Example 4

400 g. of the same ammonium sulphite lye powder which was used in Example 1 was extracted with 2000 ml. methanol for 4 hours at room temperature in the same way as described in Example 1. Extraction residue: 200 g. high-molecular ammonium ligninsulphonates.

(1) The dark-brown extract solution, which was decanted into a 4-liter flask, and the pH of which was 4.2, was given with relative slowness in addition of 600 ml. isobutanol. The precipitated ammonium salts were filtered off, washed (10 x 3 ml. methanol/isobutanol 3:1)

and then dried and weighed. Yield: 70 g. low-molecular ammonium ligninsulphonates.

(2) The still brown residual extract solution, the pH of which was 4.3, was given a further addition of 850 ml. of isobutanol, after which the precipitated ammonium salts were filtered off, washed (10 x 2 ml. methanol/isobutanol 2:1), and then dried and weighed. Yield: 31 g. low-molecular ammonium ligninsulphonates.

(3) The light-brown filtrate, the pH of which was 4.5, was then under good stirring slowly given an addition of 6 g. $CaCl_2$ dissolved in 70 ml. methanol, after which there was added, likewise slowly, NaOH dissolved in methanol until pH was 7.4.

The precipitated Ca-salts were filtered off, washed (10 x 3 ml. methanol), dried and weighed. Yield: 36 g. Ca-salts of low-molecular sulphocarboxylic acids.

(4) The yellow-brown residual extract solution was first conducted through a 100 g. column of Dowex 50 in acid form, and then through a 100 g. column of Amberlite IRA400 in alkaline form, after which the saltless, carbohydrate-containing, residual extract solution was subjected to fractionated distillation under vacuum, whereby methanol was recovered at 27–30° C. and isobutanol at 65–70° C., after which a little water was added to the distillation residue and the product dried and weighed. Yield: 57 g. carbohydrates (hexoses and pentoses).

*Example 5*

400 g. of the same ammonium sulphite lye powder which was used in Example 1 was extracted with 2000 ml. methanol for 4 hours at room temperature in the same way as stated in Example 1. Extraction residue: 199 g. high-molecular ammonium ligninsulphonates.

(1) To the dark-brown extract solution, which was decanted into a 3-liter flask and the pH of which was 4.1, was added with relative slowness 8 g. NaOH dissolved in 90 ml. methanol, whereby the pH of the precipitation solution rose to 8.1, and then 750 ml. n-propanol was slowly added. The precipitated Na-salts were filtered off, washed (10 x 3 ml. methanol) and then dried and weighed. Yield: 101 g. molecular Na-ligninsulphonates.

(2) To the yellow-brown filtrate was slowly added 6 g. $CaCl_2$ dissolved in 70 ml. methanol, after which the precipitated Ca-salts were filtrated off, washed (10 x 2 ml. methanol) and then dried and weighed. Yield: 38 g. Ca-salts of low-molecular sulphocarboxylic acids, containing a little $CaSO_4$.

(3) The light-brown residual extract solution, the pH of which was 6.9, was then first passed through a 100 g. column of Dowex 50 in acid form, and then through a 100 g. column of Amberlite IRA400 in alkaline form, after which the saltless, carbohydrate-containing, residual extract solution was subjected to fractionated distillation under vacuum, whereby the methanol was recovered at 26–29° C. and n-propanol at 55–60° C., after which a little water was added to the distillation residue and then dried and weighed. Yield: 58.5 g. carbohydrates (hexoses and pentoses).

*Example 6*

400 g. of the same ammonium sulphite lye powder which was used in example 1 was extracted with 2000 ml. methanol for 4 hours at room temperature in the same way as described in Example 1. The extraction residue was: 199 g. high-molecular ammonium ligninsulphonates.

(1) The dark-brown extract solution, which was decanted into a 4-liter flask and the pH of which was 4.2, was then with relative slowness given an addition of 4 g. NaOH in 45 ml. methanol, and then, likewise with relative slowness, an addition of 400 ml. n-propanol. The precipitated Na-salts were filtered off, washed (10 x 2 ml. methanol) and then dried and weighed. Yield: 48 g. low-molecular Na-ligninsulphonates.

(2) To the still brown-coloured filtrate was then added, under good stirring and slowly, a further 4 g. NaOH dissolved in 45 ml. methanol, and then, also slowly, a further 350 ml. n-propanol. The pH of the precipitation system was then 8.0. The precipitated Na-salts were filtered off, washed (10 x 2 ml. methanol), dried and weighed. Yield: 53 g. low-molecular Na-ligninsulphonates.

(3) The light-brown filtrate, the pH of which was now 7.9, was under good stirring given an addition of 7 g. NaOH dissolved in 90 ml. methanol, and then likewise slowly an addition of 900 ml. n-propanol. The pH of the precipitation system was now 10.6. The precipitated Na-salts were filtered off, washed (10 x 3 ml. methanol/n-propanol 2:1), and then dried and weighed. Yield: 38 g. Na-salts of low-molecular sulphocarboxylic acids.

(4) To the yellow-brown residual extract solution was then added under good stirring concentrated sulphuric acid for precipitation of the base excess until the pH was 7.5, after which the precipitated sulphates were filtered off and washed with 10 x 3 ml. methanol. Then the filtrate was first passed through a 100 g. column of Dowex 50 in acid form and afterwards through a 100 g. column of Amberlite IRA400 in alkaline form, after which the saltless, carbohydrate-containing, residual extract solution was subjected to fractionated distillation under vacuum, whereby the methanol was recovered at 26–29° C. and the n-propanol at 58–61° C., after which a little water was added to the distillation residue and the product dried and weighed. Yield: 58 g. carbohydrates (hexoses and pentoses).

*Example 7*

400 g. of the same ammonium sulphite lye powder as was used in Example 1 was extracted with 2000 ml. methanol for 4 hours at room temperature, as described in Example 1. Extraction residue: 198 g. high-molecular ammonium ligninsulphonates.

(1) The dark-brown extract solution was decanted into a 4-liter flask and had a pH of 4.15. To this was then added under good stirring and slowly 1000 ml. n-propanol.

The precipitated ammonium salts were filtered off, washed (10 x 4 ml. methanol/n-propanol 2:1), dried and weighed. Yield: 62 g. low-molecular ammonium ligninsulphonates.

(2) The still brown-coloured filtrate was then under good stirring slowly given a further addition of 1000 ml. n-propanol, after which the precipitated ammonium salts were filtered off, washed (10 x 3 ml. methanol/n-propanol 2:1), dried and weighed. Yield: 37 g. low-molecular ammonium ligninsulphonates.

(3) To the light-brown filtrate, the pH of which was 4.3, was slowly added under good stirring 4.5 g. $CaCl_2$ dissolved in 60 ml. methanol, after which there was added, likewise slowly, NaOH dissolved in methanol until the pH was 5.5. The precipitated Ca-salts were then filtered off, washed (10 x 2 ml. methanol), dried and weighed. Yield: 31 g. Ca-salts of low-molecular sulphocarboxylic acids, containing a little $CaSO_4$.

(4) The yellow-brown filtrate was then under good stirring given slowly a further addition of 2.5 g. $CaCl_2$, dissolved in 30 ml. methanol, and then—likewise slowly —an addition of NaOH dissolved in methanol until the pH was 8.1. The precipitated Ca-salts were filtered off, washed (10 x 2 ml. methanol), dried and weighed. Yield: 11 g. Ca-salts of low-molecular sulphocarboxylic acids, together with a little Ca-sulphite.

(5) The yellow-brown residual extract solution was then first conducted through a 100 g. column of Dowex 50 in acid form, and then through a 120 g. column of Amberlite IRA400 in alkaline form, after which the saltless carbohydrate-containing, residual extract solution was subjected to fractionated distillation under vacuum, whereby the methanol was recovered at 28–32°

C. and the n-propanol at 57–61° C., after which a little water was added to the distillation residue and then the mixture dried and weighed. Yield: 59 g. carbohydrates (hexoses and pentoses).

*Example 8*

400 g. of the same ammonium sulphite lye powder which was used in Example 1 was extracted with 2000 ml. methanol for 4 hours at room temperature, as described in Example 1. Extraction residue: 196 g. highmolecular ammonium ligninsulphonates.

(1) To the dark-brown extract solution, which was decanted into a 4-liter flask and the pH of which was 4.2, there was added with relative slowness and under good stirring 2000 ml. n-propanol, after which the precipitated ammonium salts were filtered off, washed (10 x 4 ml. methanol/n-propanol 2:1), dried and weighed. Yield: 102 g. low-molecular ammonium lingninsulphonates.

(2) The brown-coloured filtrate, the pH of which was 4.3, was then under good stirring given slowly an addition of 9 g. NaOH, dissolved in 85 ml. methanol, whereby that precipitation system's pH rose to 10.4. The precipitated Na-salts were filtered off, washed (10 x 3 ml. methanol/n-propanol 1:1), dried and weighed. Yield: 41 g. Na-salts of low-molecular sulphocarboxylic acids, with a little Na-sulphite and Na-sulphate.

(3) The yellow-brown residual extract solution was then under good stirring given an addition of concentrated sulphuric acid until the pH was 7.2, after which the precipitated sulphates were filtered off and washed with 10 x 2 ml. methanol, whereupon the filtrate was first passed through a 100 g. column of Dowex 50 in acid form and then through a 100 g. column of Amberlite IRA400 in alkaline form.

The thus saltless, carbohydrate-containing, residual extract solution was then subjected to fractionated distillation under vacuum, whereby the methanol was recovered at 25–29° C. and the n-propanol at 55–60° C., after which the distillation residue was mixed a little water and then dried and weighed. Yield: 59 g. carbohydrates (hexoses and pentoses).

*Example 9*

343 g. ammonium sulphite lye powder, free from carbohydrate, produced by torula fermentation of a solution of the same ammonium sulphite lye powder as was used in Example 1, in the course of which 14.3% of the dry substance of the carbohydrates was fermented, was extracted with 2000 ml. methanol for 4 hours at room temperature in a manner similar to the one described in Example 1. Extraction residue: 201 g. high-molecular ammonium ligninsulphonates.

(1) To the dark-brown extract solution, the pH of which was 4.9, there was then slowly added under good stirring 30 g. NaOH, dissolved in 230 ml. methanol whereby the pH of the precipitation system rose to 11.8. The precipitated Na-salts were filtered off, washed (10 x 3 ml. methanol), dried and weighed. Yield: 103 g. low-molecular Na-ligninsulphonates.

(2) The yellow-brown filtrate was then under good stirring given an addition of concentrated sulphuric acid until the pH was 7.7, after which the precipitated sulphates were filtered off and washed with 10 x 3 ml. methanol. To the filtrate was then added slowly and under good stirring 6 g. CaCl$_2$, dissolved in 70 ml. methanol, after which the precipitated Ca-salts were filtered off, washed (10 x 3 ml. methanol), dried and weighed. Yield: 38 g. Ca-salts of low-molecular sulphocarboxylic acids.

(3) The only slightly yellow residual extract solution was then first conducted through a 100 g. column of Dowex 50 in acid form and afterwards through a 100 g. column of Amberlite IRA400 in alkaline form, after which the saltless, practically pure, methanol was led into a 2-liter flask, under stirring given an addition of 12 g. CaO for removal of a little superfluous water, after which the thus cleaned and partly dried methanol was returned for further extraction.

*Example 10*

400 g. of the same ammonium sulphite lye powder as was used in Example 1 was extracted with the 2000 ml. recovered methanol from Example 9 for 4 hours at room temperature, in the same way as described in Example 1. Extraction residue: 202 g. high-molecular ammonium ligninsulphonates.

(1) The dark-brown extract solution was next evaporated under vacuum to a residual volume of 600 ml., and methanol was recovered at 25–28° C.

(2) To the thus partly evaporated and dark-coloured extract solution was then added under good stirring and slowly 14 g. NaOH, dissolved in 120 ml. methanol, and then, likewise slowly 150 ml. n-propanol. The precipitated Na-salts were filtered off and washed (10 x 4 ml. methanol/n-propanol 4:1), and then dried and weighed. Yield: 98 g. low-molecular Na-ligninsulphonates.

(3) The brown-coloured filtrate was then under stirring given an addition of concentrated sulphuric acid until the pH was 7.8 for removal of the base excess, and the precipitated sulphates were then filtered off and washed with 10 x 3 ml. methanol, after which 6 g. CaCl$_2$, dissolved in 70 ml. methanol, was added to the filtrate with relative slowness and under good stirring.

The precipitated Ca-salts were then filtered off and washed (10 x 3 ml. methanol), and afterwards dried and weighed. Yield: 37 g. Ca-salts of low-molecular sulphocarboxylic acids.

(4) The yellow-brown residual extract solution was first passed through a 50 g. column of Dowex 50 in acid form, and then through a 80 g. column of Amberlite IRA400 in alkaline form, after which the saltless, carbohydrate-containing, residual extract solution was subjected to fractionated distillation, whereby the methanol was recovered at 25–28° C. and the n-propanol at 58–62° C., after which the distillation residue was mixed with a little water and then dried and weighed. Yield: 57 g. carbohydrates (hexoses and pentoses).

*Example 11*

400 g. of the same ammonium sulphite lye powder as was used in Example 1 was extracted with 2000 ml. ethanol for 18 hours at room temperature in a similar way to the one described in Example 1. At the end of the extraction the stirring mechanism was stopped and the undissolved substance was allowed to settle, after which the clear, brown-coloured extract solution was decanted into another 2-liter flask. The sedimented substance in the extraction flask was then heated to 65–70° C., whereby the remainder of the extract solution was separated out and was united with the other extract solution. Next the extraction residue was washed and kneaded with 10 x 3 ml. ethylalcohol, which was then likewise added to the extract solution. The extraction residue was then taken out of the flask and dried, as described in Example 1. Extraction residue: 336 g. consisting of both high- and low-molecular ammonium ligninsulphonates and hexoses.

(1) To the brown-coloured extract solution, the pH of which was 4.9 there was added slowly and under good stirring 7.2 g. NaOH, dissolved in 80 ml. ethanol, whereby the pH rose to 9.9, after which the precipitation system was cooled to 8° C., and then the precipitated Na-salts were filtered off and washed with 10 x 3 ml. ethanol, dried and weighed. Yield: 38 g. Na-salts of sulphocarboxylic acids.

(2) The light-brown filtrate, the pH of which was 9.3 was next under good stirring and slowly given an addition of 4.5 g. CaCl$_2$, dissolved in 45 ml. ethanol. The precipitated Ca-salts were then filtered off and washed with 10 x 3 ml. ethanol, and then dried and weighed. Yield: 12 g. Ca-salts of aldonic acids.

(3) The yellow-coloured residual extract solution, the pH of which was 8.2, was first passed through a 100 g. column of Dowex 50 in acid form, and then through an 80 g. column of Amberlite IRA400 in alkaline form, after which the saltless, carbohydrate-containing, residual extract solution was used for extraction of further quantities of lye powder.

Example 12

The dried and pulverized extraction residue of 336 g. from Example 11 was extracted with 2000 ml. methanol for 4 hours at room temperature in the way described in Example 1. Extraction residue: 190 g. high-molecular ammonium ligninsulphonates.

(1) To the dark-brown extract solution, which was decanted into a 3-liter flask, there was then added under good stirring and with relative slowness 8 g. NaOH, dissolved in 90 ml. methanol, and then, likewise slowly, 850 ml. n-propanol. The precipitated Na-salts were then filtered off and washed with 10 x 3 ml. methanol/n-propanol 5:2, dried and weighed. Yield: 100 g. low-molecular Na-ligninsulphonates.

(2) The light-brown residual extract solution was next passed through a 100 g. column of Dowex 50 in acid form, after which the saltless carbohydrate-containing, residual extract solution was subjected to fractionated distillation under vacuum, whereby the methanol was recovered at 26–30° C. and the n-propanol at 57–60° C. The distillation residue was then mixed with a little water and then dried and weighed. Yield: 45 g. carbohydrates (hexoses).

Example 13

400 g. of the same ammonium sulphite lye powder as was used in Example 1 was extracted for 18 hours with the refined carbohydrate-containing residual extract solution from Example 1, in the manner described in Example 11. Extraction residue: 337 g. consisting of both high- and low-molecular ammonium ligninsulphonates, and hexoses.

(1) To the brown-coloured extract solution, the pH of which was 4.8, there was added, in a 3-liter flask, under good stirring and with relative slowness 6.4 g. NaOH, dissolved in 80 ml. ethanol, and then—likewise slowly—300 ml. n-propanol, whereby the pH of the precipitation system rose to 9.6. The extract solution was then cooled to 8° C., after which the precipitated Na-salts were filtered off and washed with 10 x 2 ml. ethanol-n-propanol 4:1 and then dried and weighed. Yield: 39 g. Na-salts of sulphocarboxylic acids.

(2) The yellow-brown residual extract solution was then under good stirring and with relative slowness given an addition of 4 g. NaOH, dissolved in 60 ml. ethanol, whereby the pH rose to 11.5. Next the precipitation system was cooled to 8° C., and then the precipitated Na-salts were filtered off and washed with 10 x 2 ml. ethanol/n-propanol, dried and weighed. Yield: 10.5 g. Na-salts of aldonic acids.

(3) The yellow-coloured residual extract solution was then under stirring given an addition of concentrated sulphuric acid until the pH was about 7, and the precipitated sulphates were filtered off and washed with ethanol, after which the neutral residual extract soluiton was conducted through a 30 g. column of Dowex 50 in acid form, and then through a 40 g. column of Amberlite IRA400 in alkaline form. The now saltless carbohydrate-containing, residual extract solution was then subjected to fractionated distillation under vacuum, whereby the ethanol was recovered at 41–45° C. and the n-propanol at 56–60° C., after which the distillation residue was mixed with a little water and removed from the distillation flask, dried and weighed. Yield: 27 g. mainly pentoses.

Example 14

The dried and pulverized extraction residue of 337 g. from Example 13 was extracted with 2000 ml. methanol for 4 hours at room temperature in the same way as described in Example 1. Extraction residue: 192 g. high-molecular ammonium ligninsulphonates.

(1) To the dark-brown extract solution, which was decanted into a 4-liter flask, there was then added slowly and under good stirring 2000 ml. n-propanol. The precipitated ammonium salts were next filtered off, washed with 10 x 4 ml. methanol/n-propanol 2:1, dried and weighed. Yield: 99 g. low-molecular ammonium ligninsulphonates.

(2) The practically saltless carbohydrate-containing, residual extract solution was then subjected to fractionated distillation under vacuum, whereby the ethanol was recovered at 40–44° C. and the n-propanol at 55–59° C., after which the distillation residue was mixed with a little water and removed from the distillation flask. It was then dried and weighed. Yield: 45 g. carbohydrates (hexoses).

I claim:

1. A process for the fractionating of sulphite waste lye, comprising the following steps: evaporating ammonium sulphite lye containing ammonium as principal cation to a practically dry powder, extracting said powder with methanol, removing the high molecular ligninsulphonic acids insoluble in said organic liquid from the solution thus obtained, adding to said solution an aliphatic alcohol with from 3 to 4 carbon atoms, thereby precipitating the ammonium salts of the low molecular ligninsulphonic acids, removing the precipitated ammonium salts of the low molecular ligninsulphonic acids from the solution, adding to the thus obtained solution an alklali to a pH of about 10 thereby precipitating the sulphocarboxylic acids as sodium salts, removing said precipitated salts from the solution, adding to the solution thus obtained a soluble metal salt, the cation of which has a valency greater than 1 thereby precipitating the aldonic acids as salts, removing the precipitated salts of the aldonic acids, removing the electrolytes from the solution thus obtained, and recovering the organic liquids by fractional distillation, thereby obtaining as residue the carbohydrates as a separate fraction.

2. A process for the fractionating of sulphite waste lye, comprising the following steps: evaporating sulphite lye containing ammonium as principal cation to a practically dry powder, extracting said powder with methanol, removing the high-molecular ligninsulphonic acids insoluble in said alcohol from the solution thus obtained, adding to said solution an alkali in an amount about equivalent to the low-molecular ligninsulphonic acids, precipitating the corresponding alkali salts of the said acids by adding an aliphatic alcohol with from 3 to 4 carbon atoms, removing the precipitated sodium salts, precipitating the sulphocarboxylic acids by adding equivalent amounts of a soluble metal salt, the cation of which has a valence greater than 1, removing the precipitated salts, adjusting the pH of the solution to between 8 and 11 with an alkali, and then precipitating the aldonic acids as salts by adding equivalent amount of a soluble metal salt, the cation of which has a valence greater than 1, removing the precipitated aldonic acid salts, removing the electrolytes from the filtrate, and finally recovering the alcohols by fractional distillation, thereby obtaining as residue the carbohydrates as a separate fraction.

3. Process for the fractionating of sulphite waste lye, comprising the following steps: evaporating sulphite lye containing ammonium as principal cation to a practically dry powder, extracting said power with methanol, removing the high-molecular ligninsulphonic acids insoluble in said alcohols from the solution thus obtained, precipitating the low-molecular ligninsulphonic acids by adding to the filtrate an alkali to a pH-value between 10 and 12, removing the precipitated salts, adjusting the pH of the solution to between 7 and 8 by means of a mineral acid, removing the precipitated alkali salt of said mineral acid, adding to the filtrate a soluble metal salt, the cation of which has a valance greater than 1, in an amount equivalent to the sulphocarboxylic acids present, thereby precipitating this lye component, raising the pH of the remaining solution to a value between 8 and 11 by means of an alkali, and precipitating the aldonic acids as salts by adding equivalent amounts of a metal salt, the cation of which has a valence higher than 1, recovering from the filtrate the alcohols by distillation, diluting the distillation residue with water and removing the impurities by ion exchange, obtaining finally the carbohydrates as a separate fraction.

4. A process as claimed in claim 1, wherein the precipitation of the extracted lye components is carried out in fractions by portionwise addition of precipitation agent with intermediate filtering off of the precipitated products.

5. A process as claimed in claim 2, wherein the precipitation of the extracted lye components is carried out in fractions by portionwise addition of precipitating agent with intermediate filtering off of the precipitated products.

6. A process as claimed in claim 3, wherein the precipitation of the extracted lye component is carried out in fractions by portionwise addition of precipitation agent with intermediate filtering off of the precipitated products.

7. A process for the fractionating of sulphite waste lye, comprising the following steps: evaporating ammonium sulphite lye containing ammonium as principal cation to a practically dry powder, extracting said powder with ethylene glycol, removing the high molecular ligninsulphonic acids insoluble in said organic liquid from the solution thus obtained, adding to said solution an aliphatic alcohol with from 3 to 4 carbon atoms, thereby precipitating the ammonium salts of the low molecular ligninsulphonic acids, removing the precipitated ammonium salts of the low molecular ligninsulphonic acids from the solution, adding to the thus obtained solution an alkali to a pH of about 10 thereby precipitating the sulphocarboxylic acids as sodium salts, removing said precipitated salts from the solution, adding to the solution thus obtained a soluble metal salt, the cation of which has a valency greater than 1 thereby precipitating the aldonic acids as salts, removing the precipitated salts of the aldonic acids, removing the electrolytes from the solution thus obtained, and recovering the organic liquids by fractional distillation, thereby obtaining as residue the carbohydrates as a separate fraction.

8. A process for the fractionating of sulphite waste lye, comprising the following steps: evaporating sulphite lye containing ammonium as principal cation to a practically dry powder, extracting said power with ethylene glycol, removing the high-molecular ligninsulphonic acids insoluble in said alcohol from the solution thus obtained, adding to said soluttion an alkali in an amount about equivalent to the low-molecular ligninsulphonic acids, precipitating the corresponding alkali salts of the said acids by adding an aliphatic alcohol with from 3 to 4 carbon atoms, removing the precipitated sodium salts, precipitating the sulphocarboxylic acids by adding equivalent amounts of a soluble metal salt. the cation of which has a valence greater than 1, removing the precipitated salts, adjusting the pH of the solution to between 8 and 11 with an alkali, and then precipitating the aldonic acids as salts by adding equivalent amount of a soluble metal salt, the cation of which has a valence greater than 1, removing the precipitated aldonic acid salts, removing the electrolytes from the filtrate, and finally recovering the alcohols by fractional distillation, thereby obtaining as residue the carbohydrates as a separate fraction.

9. Process for the fractionating of sulphite waste lye, comprising the following steps: evaporating sulphite lye containing ammonium as principal cation to a practically dry powder, extracting said powder with ethylene glycol, removing the high-molecular ligninsulphonic acids insoluble in said alcohols from the solution thus obtained, precipitating the low-molecular ligninsulphonic acids by adding to the filtrate an alkali to a pH-value between 10 and 12, removing the precipitated salts, adjusting the pH of the solution to between 7 and 8 by means of a mineral acid, removing the precipitated alkali salt of said mineral acid, adding to the filtrate a soluble metal salt, the cation of which has a valence greater than 1, in an amount equivalent to the sulphocarboxylic acids present, thereby precipitating this lye component, raising the pH of the remaining solution to a value between 8 and 11 by means of an alkali, and precipitating the aldonic acids as salts by adding equivalent amounts of a metal salt, the cation of which has a valence higher than 1, recovering from the filtrate the alcohols by distillation, diluting the distillation residue with water and removing the impurities by ion exchange, obtaining finally the carbohydrates as a separate fraction.

10. A process as claimed in claim 7, wherein the precipitation of the extracted lye components is carried out in fractions by portionwise addition of precipitation agent with intermediate filtering off of the precipitated products.

11. A process as claimed in claim 8, wherein the precipitation of the extracted lye components is carried out in fractions by portionwise addition of precipitating agent with intermediate filtering off of the precipitated products.

12. A process as claimed in claim 9, wherein the precipitation of the extracted lye component is carried out in fractions by portionwise addition of precipitation agent with intermediate filtering off of the precipitated products.

No references cited.

UNITED STATES PATENT OFFICE

CERTIFICATE OF CORRECTION

Patent No. 2,865,906 December 23, 1958

John Höye

It is hereby certified that error appears in the above numbered patent requiring correction and that the said Letters Patent should read as corrected below.

In the grant, lines 2 and 11, and in the heading to the printed specification, lines 4 and 5, name of assignee, for "Aktieselskabet Token Cellulosefabrik", each occurrence, read -- Aktieselskabet Toten Cellulosefabrik --.

Signed and sealed this 19th day of May 1959.

(SEAL)
Attest:

KARL H. AXLINE
Attesting Officer

ROBERT C. WATSON
Commissioner of Patents